United States Patent [19]
Vital et al.

[11] 3,943,406
[45] Mar. 9, 1976

[54] CONTROL OF ELECTRONICALLY GENERATED LIGHT PULSES
[75] Inventors: Zoltan Vital, Uccle; Jean Orban, Clabecq, both of Belgium
[73] Assignee: Ponder and Best, Inc., Los Angeles, Calif.
[22] Filed: May 10, 1973
[21] Appl. No.: 358,974

Related U.S. Application Data
[60] Division of Ser. No. 17,634, March 9, 1970, Pat. No. 3,749,921, which is a continuation-in-part of Ser. No. 799,554, Feb. 13, 1969, abandoned.

[30] Foreign Application Priority Data
Mar. 7, 1969 Belgium ............................... 71104
June 27, 1969 Belgium ............................... 75962
Sept. 22, 1969 Belgium ............................... 79321

[52] U.S. Cl. .............. 315/241 P; 315/146; 315/156
[51] Int. Cl.² ........................................ H05B 39/00
[58] Field of Search .......... 315/241 P, 156, 44, 151, 315/158

[56] References Cited
UNITED STATES PATENTS
3,033,988  5/1962  Edgerton ............................ 250/205
3,340,426  9/1967  Elliott ................................ 315/151
3,350,604  10/1967 Erickson ............................ 315/151
3,585,442  6/1971  Krusche et al. ..................... 315/151
3,634,725  1/1972  Biber ................................ 315/241 P Primary Examiner—Nathan Kaufman
Attorney, Agent, or Firm—Spencer & Kaye

[57] ABSTRACT

Circuits and auxiliary elements for use with a device for controlling the emission of light pulses from a flash unit, which light pulses are produced by the discharge of current pulses from a capacitor, the device including a light sensing element for receiving light produced by the flash unit and reflected from an object in the light path. One such circuit includes two zener diodes for providing threshold voltages for use in comparing the output of the light sensing element. Another such circuit compensates for nonlinearities in the response of certain components of the device.

7 Claims, 8 Drawing Figures

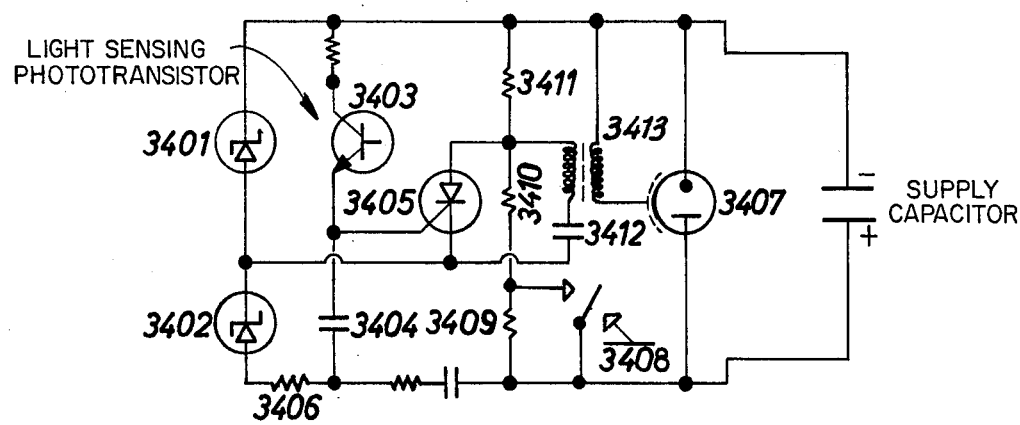
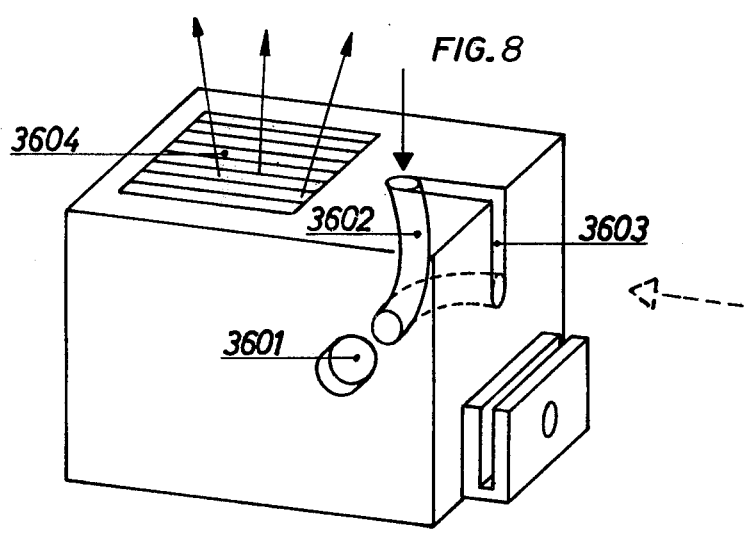

CONTROL OF ELECTRONICALLY GENERATED LIGHT PULSES

CROSS-REFERENCE OF RELATED APPLICATION

This application is a division of application Ser. No. 17,634, filed Mar. 9th, 1970, now U.S. Pat. No. 3,749,921, which itself is a continuation-in-part of application Ser. No. 799,554, filed Feb. 13th, 1969, now abandoned.

BACKGROUND OF THE INVENTION

The invention concerns additional novel elements and circuits for use with the devices disclosed in our copending application Ser. No. 17,634, filed Mar. 9, 1970, now U.S. Pat. No. 3,749,921. That application discloses various devices for controlling the impulses generated by the discharge of a capacitor placed either in series or in parallel with a load and, in the case of a parallel connection, having no more than one electronic switch. The application also discloses novel switching tubes for uses as such switch.

SUMMARY OF THE INVENTION

An object of the present invention is to provide an improved measurement, computation and control of the light produced by a flash unit.

Another object of the present invention is a control device for pulses which are produced by the discharge from a capacitor, and which are delivered, for example, to the flash tube of an electronic flash unit. The control device employs two zener diodes as threshold value detectors and which is also provided with a circuit which compensates the time delay of certain components and the fluctuations in the zener voltage of the zener diodes, thereby to permit the flash unit to be controlled at different light intensity settings. The device is supplemented by a photoelectronic remote triggering device provided with a system which permits use even with indirect flashes from the flash unit. Means are provided to permit automatic switching between the devices.

Any of the light control devices described in our copending U.S. application Ser. No. 17,634 may be supplemented with a threshold value detector consisting of two zener diodes, a resistor for the compensation of the delays and variations in certain components, and a switch which permits operation of the light control device with a full light intensity output or a partial light intensity output of the flash unit.

BRIEF DESCRIPTION OF THE DRAWINGS

FIG. 7 is a circuit diagram of a modified light duration control circuit according to the invention.

FIG. 8 is a perspective view of an automatically controlled flash unit according to the invention.

DESCRIPTION OF THE PREFERRED EMBODIMENTS

Figure 1:
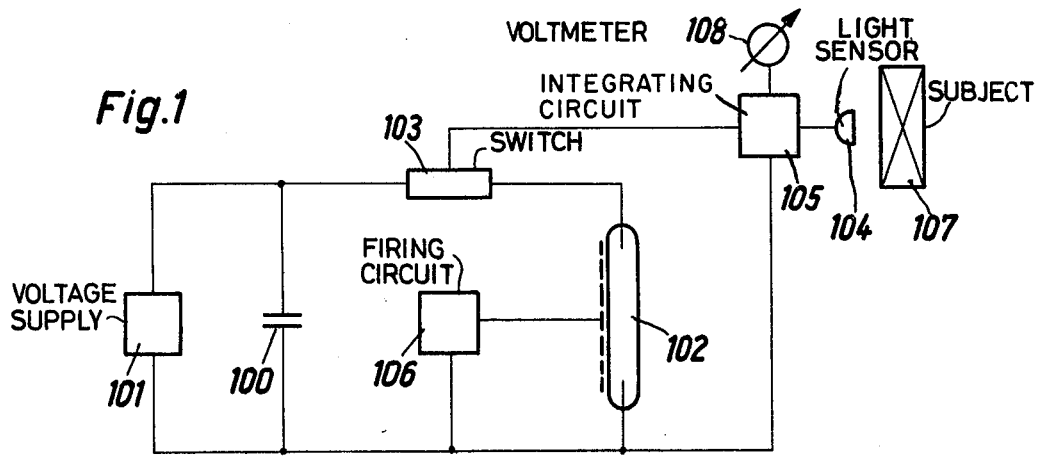
FIG. 1 is a schematic circuit diagram of a basic circuit with which the improvements according to the present invention can be used.

FIG. 1 shows the circuit of an electronic photoflash equipped with a control device having only one switch whose purpose is to arrest the capacitor discharge when a predetermined amount of light has been produced.

The arrangement of such a unit is as follows:

An energy storage capacitor 100 is charged through a voltage source 101. A flash tube 102 of the usual type is connected to the capacitor terminals through a switch 103 which is preferably a gate-turn-out thyristor or thyratron, etc., provided, if necessary, with suitable supplementary circuitry. A light sensor 104, composed of a photodiode, phototransistor, photoresistance, or other, is connected to an integrating circuit 105 of any well-known type. A firing circuit 106 triggers the firing of the flash tube 102. This device works as follows:

The capacitor 100 having been charged by the source 101, the ionization of the flash tube 102 is induced by the action of the firing circuit 106. The light sensor 104 supplying an instantaneous current proportional to the illumination on subject 107, to the integrating circuit 105, the latter, when the total amount of light received by the light sensor 104 reaches a predetermined value, causes a circuit to "swing", thus supplying an impulse to the switch 103 which then interrupts the discharge of the capacitor 100.

Thus, the light emission of the flash tube is arrested after producing the requisite amount of light, without any energy being withdraw from the capacitor other than that used for producing the light, and possibly for commutating the circuit.

The arrangement of FIG. 1 may be completed in the following manner: by connecting a voltmeter 108 to the terminals of the integrator circuit 105, which is designed for such a connection, an integrating photometer, or chronometer, can be produced, which device has scales in different measuring units.

Figure 2:
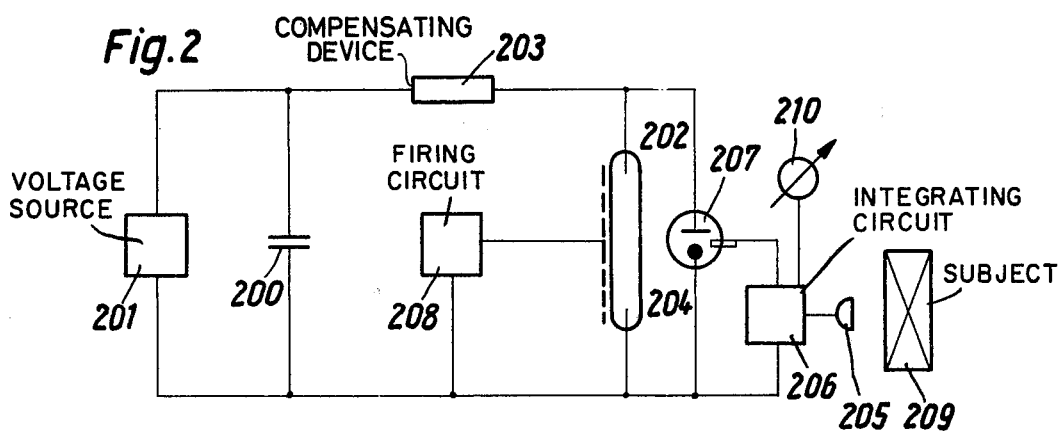
FIG. 2 is a schematic circuit diagram of another form of construction of the circuit of FIG. 1.

Another variant is illustrated in FIG. 2 in which we describe a control device connected both in series and parallel with the load and combined with a compensating device, capable of also being used with the preceding embodiment, constituted by an induction coil.

The discharge capacitor 200 is charged through the voltage source 201. The flash tube 202 is connected to the terminals of the capacitor 200 through the intermediary of the induction coil 203. A thyratron 204 is connected in parallel with the flash tube 202. A light sensor 205 is coupled to the integrating circuit 206, receives reflected light from subject 209 and controls the firing electrode 207 of the thyratron 204. A firing circuit 208 acts to fire the flash tube 202. Meter 210 is connected to circuit 206.

The operation of the circuit of FIG. 2 differs from that of FIG. 1 as follows:

After reaching the predetermined signal value, the circuit of the integrator 206 triggers the firing electrode 207 of the thyratron 204 in parallel with the flash tube 202. The induction coil 203 allows for a short period during which the thyratron is practically in short-circuit. Consequently, the flash tube 202 has enough time to deionize, and hence to become extinguished.

Figure 3:
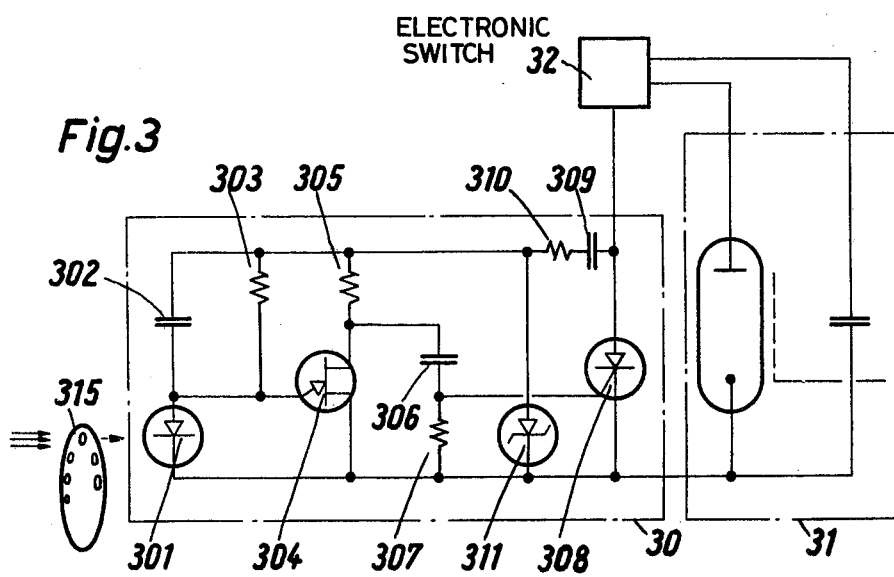
FIG. 3 is a more detailed circuit diagram containing a more detailed showing of one embodiment of a flash duration control circuit.

A modification is illustrated in FIG. 3. This control device is combined with both an electronic gate and an optical device of regulation of the sensitivity.

Figure 5:
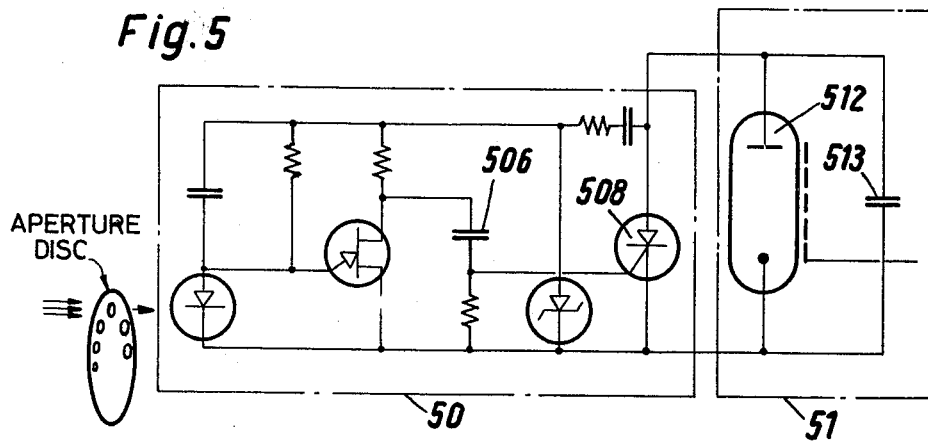
FIG. 5 is a view similar to that of FIG. 3 of still another embodiment of a flash duration control circuit.

The control device consists of an electronic device 30 which is identical with the device 50 of FIG. 5, of the photo-flash unit 31 and of an electronic switch 32.

In this device, a light sensor 301 generates a current proportional to the reflected light from the subject. This current ia integrated by a capacitor 302 to give a voltage proportional to the amount of the reflected light. This voltage is applied to a unijunction transistor 304 or to a four-layer diode or to some other element or device which would serve as suitable substitute, which develops a positive impulse in the resistance 305 as soon as the threshold "swing" or switching level, of this component 304 has been reached.

This impulse is conducted by the capacitor 306 to open a semiconductor switch, or other element, 308 by means of its firing circuit which controls the electronic switch 32 so as to terminate the capacitor discharge and thereby extinguish the flash tube of the photoflash 31.

As soon as the cycle is ended, the voltage across a resistance 303 sets the system back to its initial condition. A resistance 307 prevents a premature opening of the semiconductor switch 308. The unit 31 contains the elements of the photo-flash which are not individually referenced. The electronic device 30 contains as its principal element a semiconductor switch, such as a thyristor (SCR), or else a gas-filled switching tube, preferably of the arc arrester type or a special arc arrester, or another suitable component.

An improvement of the flash control device consists in equipping this device with an electronic gate which acts upon the reflected light sensor circuit.

FIG. 3 also illustrates the electronic gate arrangement. When the flash tube is fired, the voltage at the flash tube terminals decreases sharply. This results in a current in the circuit of the capacitor 309, the resistance 310 and the zener diode 311. A voltage equal to that across the zener diode is to appear at the terminals of the light sensor circuit so as to place it in operation. The current intensity depends on the resistance value of resistor 310. The opening duration of the electronic gate of the light sensor circuit depends on the value of the capacitor 309.

THe regulation of the sensitivity of the control device is effected by the user with the help of an adjustable optical device 315 composed of a diaphragm, a set of filters, or others, placed in front of the light sensor 301 of the control device.

Figure 4:
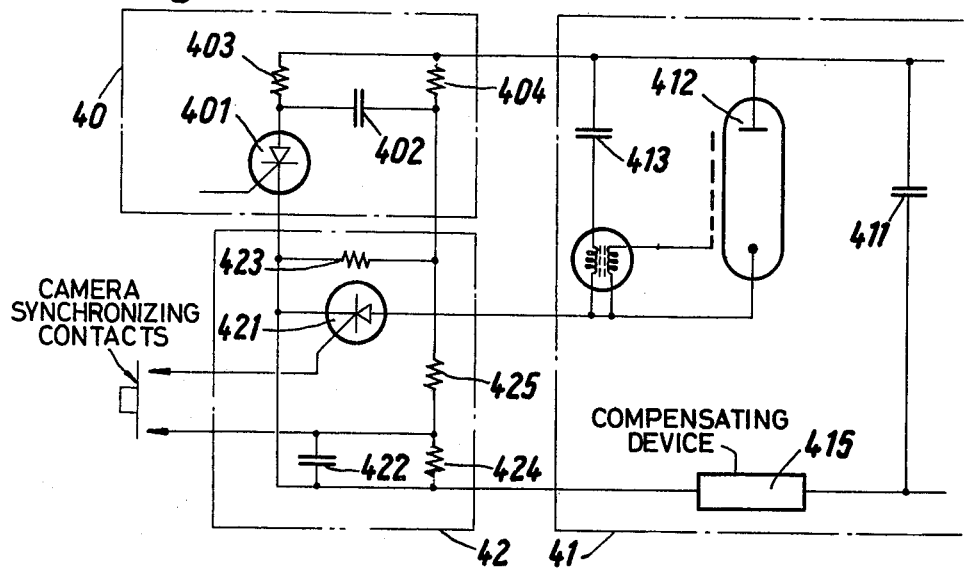
FIG. 4 is a view similar to that of FIG. 3 of another embodiment of a flash duration control circuit.

A further explanation is given with reference to FIG. 4 which shows a light control device for the flash of an electronic photoflash, consisting of the electronic device 40, which is similar to the device 30 of FIG. 3 and the device 50 of FIG. 5 and which is therefore only partially shown, of the photoflash 41, which is similar to the device 31, and of an electronic switch 42, which is similar to the device 32, connected in series with the flash tube circuit.

This device and its operation are essentially identical to those described and illustrated previously, namely:

The thyristor 421, which is fired upon closing of the camera synchronization contacts, applies the voltage of the discharge capacitor 411 across the flash tube 412, the latter having received previously a fraction of this voltage, the value of which fraction is determined by the resistances 404 and 423, and to the tube firing circuit consisting of a capacitor 413 and a transformer 414, thus firing the flash. When the thyristor 401 becomes conductive due to the subject having been sufficiently illuminated, it discharges the capacitor 402, which was previously charged, into the thyristor 421, which results in reversing the anode voltage of the thyristor for a short period so as to cause it to block and thus arrest the discharge of the capacitor 411. The capacitance value of the capacitor 402 is selected so as to obtain an impulse of sufficient duration to allow the extinction, or blocking, of the thyristor 421. The capacitance value of the capacitor 422 is selected so as to obtain the shortest possible impulse so that the extinction of the thyristor 421 may occur as rapidly as possible. The resistance 424 and 425 are used to polarize the capacitor 422. The value of resistance 403 must be selected in order to give a current lower than the maintenance current of the thyristor 401 so as to prevent the capacitor 411 from continuing to discharge itself through the thyristor 401. A compensation device, such as an induction coil, 415 modifies the discharge impulse in the flash tube. Among other things, it lengthens the discharge duration, etc.

FIG. 5 shows a control device combined with an electronic gate and with an optical device for the regulation of sensitivity. This control device consists of an electronic device 50 and the photoflash 51.

The components and operation of this device are identical to those described with reference to FIG. 3, with the difference that an impulse transmitted by the capacitor 506 opens a semi-conductor switch, or a special arc arrester, etc., 508, via its firing circuit and thereby extinguishes the flash tube 512 of the photoflash while discharging the capacitor 513 of the latter.

Figure 6:
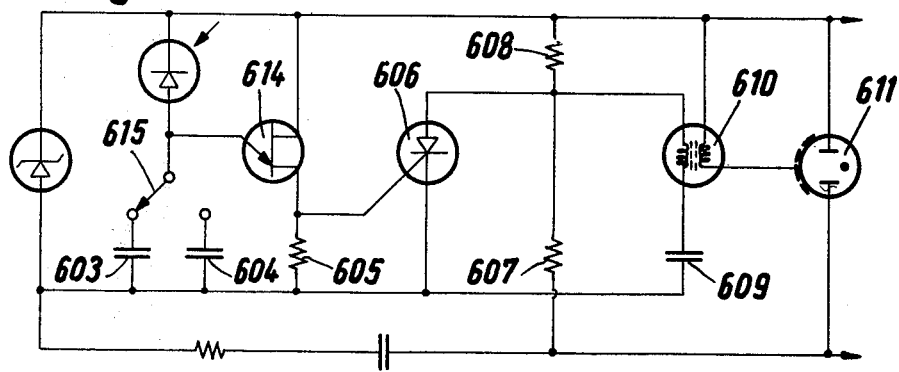
FIG. 6 is a view similar to that of FIG. 3 of yet another form of construction of a flash duration control circuit.

In FIG. 6, we describe another embodiment equipped with a special arc arrester combined with an electronic gate and with an electric device having several capacitors for the regulation of sensitivity. A special arc arrester 611 and its firing device, which consists of the thyristor 606, the resistances 607 and 608, the capacitor 609 and the transformer 610, serve as a substitute for the thyristor 508 of FIG. 5. Here, we make use of an electric circuit for adjusting the sensitivity, the circuit consisting of a switch 615 connected to select one of the capacitors 603 and 604 having different capacitance values.

FIG. 7 illustrates one embodiment of a circuit possessing other novel features according to the invention. In this case two zener diodes 3401 and 3402 are employed in a series connection so that the total voltage across them determines the supply voltage of the light-sensing phototransistor 3403. The voltage across the zener diode 3402 alone determines the value which the voltage across the integration capacitor 3404 must reach in order to fire the thyristor 3405.

The circuit includes a resistor 3406 across which is produced a voltage proportional to the nonlinearity error of the control device, which error is caused by voltage fluctuations of the zener diodes 3401 and 3402, by the switching delays of the thyristor 3405 and by the arc arrester 3407. The resistor 3406 is connected in such a way as to compensate this error.

When thyristor 3405 fires, i.e., becomes conductive, it causes capacitor 3412 to discharge through the primary winding of a transformer 3413 whose secondary winding is connected to arrester 3407. The voltage to which capacitor 3412 is charged prior to the firing of thyristor 3405 is determined in part by the value of resistors 3409, 3410 and 3411.

A switch 3408 is connected across resistor 3409 and when this switch is opened resistors 3409, 3410 and 3411 determine the voltage of the firing capacitor 3412, corresponding to the full power output of the flash.

When switch 3408 is closed, only the resistors 3410 and 3411 determines the voltage of the firing capacitor corresponding to a partial power output from the flash.

In case it is desired to produce an "indirect" flash, i.e. the flash unit is directed toward the ceiling or the wall, the light-sensitive element of a known light duration control device would receive reflected light form the ceiling or the wall, but not from the subject being photographed, so that the control device would not be responsive by the illumination of the subject being photographed.

To avoid these difficulties the present invention provides the use of one or a plurality of light-sensitive elements whose position may be adjustable and which may be provided with light conductors, which themselves may also be adjustable. The setting of these elements may occur manually or automatically.

FIG. 8 shows an electronic flash unit incorporating such an arrangement. The unit is capable of being oriented to produce a direct flash or a bounce flash. The light beam of the flash is directed and shaped in the usual manner by a lens 3604. The reflected light to be measured is received by an optical fiber element 3602 whose front face is directed toward the source of reflected light to be measured and whose rear face is directed toward the light sensitive element 3601 of a control circuit according to the invention. The front face of element 3602 is aligned with a slot 3603 in the unit housing and is connected to any suitable mechanical arrangement (not show) for undergoing a pivotal movement to direct its front face toward the light to be measured. For direct flash, the element 3602 has the position indicated in solid lines and receives light coming in the direction of the solid arrow; for bounce flash where the unit radiates light at right angles to the subject, unit 3602 has the position shown in broken lines and senses light coming from the subject in the direction indicated by the broken-line arrow. For intermediate bounce flash directions, unit 3602 can be placed in any intermediate position between the two extremes illustrated.

In the case where the device contains a plurality of light-sensitive elements which are oriented in different directions, the selection of the light-sensitive element or elements employed can be made by electric, electronic, optical, or mechanical means, etc. The selection may be manual and/or automatic.

It will be understood that the above description of the present invention is susceptible to various modifications, changes and adaptations and the same are intended to be comprehended within the meaning and range of equivalents of the appended claims.

I claim:

1. A device for controlling the light flashes generated by a flash tube in response to the pulses produced by the discharge of a capacitor, the device including a light sensitive element for measuring received light, and a circuit connected between the element and the tube for terminating a light flash when a predetermined quantity of light has been received by the element, wherein the improvement comprises a light conductor having a light input end and a light output end, and support means supporting said conductor for movement between a plurality of positions in each of which its light input end faces in a respectively different direction and its light output end is directed toward said element, for receiving reflections of light flashes produced by said tube from any one of the respectively different directions, independent of the general direction produced by said tube, and for conducting the light received at its said light input end to said element.

2. In a device for controlling the duration of a pulse generated during the discharge of a capacitor into a load of a type which converts such pulse into an output, the control being effected in response to a measurement of such output, which device includes sensing means arranged to monitor such output and having an electrical conductivity which varies as a function of the value of such output, indicating means connected to the sensing means for providing a voltage representative of the current through the sensing means, and trigger means connected to the indicating means for producing a signal for controlling the pulse when the voltage across said indicating means reaches a selected value, the improvement comprising two zener diodes connected in series with one another; means connecting the series arrangement of said zener diodes across the capacitor; means operatively connecting the series arrangement of said two zener diodes to said sensing means for causing the total voltage across said series arrangement to provide the operating voltage for said sensing means; and means connecting the junction between said two zener diodes to said trigger means for causing the voltage across one of said two zener diodes to control the value which the voltage at said indicating means must reach in order to cause said trigger means to produce such signal, whereby the value which the voltage at said indicating means must reach for such purpose remains a predetermined proportion of the value of the operating voltage for said sensing means.

3. A device as defined in claim 2 wherein said indicating means comprises an integrating element providing a voltage representative of the time integral of the current through said sensing means, and said trigger means comprises a thyristor having a control electrode connected to receive the output from said indicating means.

4. A device as defined in claim 3 wherein said zener diodes are connected to said trigger means to cause the voltage at the point of connection between said two zener diodes to be applied to one of the main electrodes of said thyristor.

5. A device as defined in claim 4 wherein said trigger means further comprises a trigger transformer and a trigger capacitor, with said trigger capacitor being connected in series with the primary winding of said transformer and the series arrangement of said primary winding and said trigger capacitor being connected between the main electrodes of said thyristor.

6. A device as defined in claim 5 wherein said trigger means further comprises a voltage divider having its input connected to receive the voltage across the capacitor and having an output tap operatively connected to said trigger capacitor for preliminarily charging said trigger capacitor to a voltage determined by the ratio between the voltage at the input of said divider and the voltage at the output tap thereof.

7. An arrangement as defined in claim 2 further comprising a resistive compensating element connected in series with the series arrangement of said two zener diodes for compensating for fluctuations in the voltage across the series arrangement of said zener diodes.

* * * * *